United States Patent
Hugl et al.

[11] 4,119,623
[45] Oct. 10, 1978

[54] WATER-SOLUBLE DIPHENYLAMINE-AZO-SULFATOALKOXYPHENYL DYESTUFFS

[75] Inventors: Herbert Hugl; Hans-Günter Otten; Richard Sommer; Gerhard Wolfrum, all of Leverkusen, Germany

[73] Assignee: Bayer Aktiengesellschaft, Leverkusen, Germany

[21] Appl. No.: 713,820

[22] Filed: Aug. 12, 1976

[30] Foreign Application Priority Data

Aug. 16, 1975 [DE] Fed. Rep. of Germany ....... 2536489
Dec. 19, 1975 [DE] Fed. Rep. of Germany ....... 2557504

[51] Int. Cl.² .............................................. C09B 43/00
[52] U.S. Cl. .................................... 260/206; 260/152; 260/156; 260/207
[58] Field of Search ...................... 260/206, 207, 207.1

[56] References Cited

U.S. PATENT DOCUMENTS

| | | | |
|---|---|---|---|
| 3,883,503 | 5/1975 | Van Assche et al. | 260/206 |
| 3,956,267 | 5/1976 | Sommer et al. | 260/207 X |
| 3,994,873 | 11/1976 | Sommer et al. | 260/206 |

*Primary Examiner*—Charles F. Warren
*Attorney, Agent, or Firm*—Plumley & Tyner

[57] ABSTRACT

Dyestuffs, which in the form of the free acid of the formula

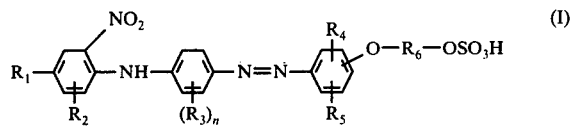

wherein
$R_1$ denotes hydrogen, nitro, cyano, $SO_2$—$R_7$, $CONR_8R_9$, $SO_2NR_8R_9$, $SO_2OR_{10}$, $COOR_{10}$, $SO_2$—$NHSO_2$—$R_{11}$, sulpho or alkyl,
$R_2$ denotes hydrogen, nitro, halogen or optionally substituted alkyl, alkoxy or aryl,
$R_3$ denotes hydrogen, halogen, $SO_2$—$R_7$, $SO_2$—$NR_8R_9$ or optionally subsituted alkyl, alkoxy or aryl,
$R_4$ denotes hydrogen, halogen or optionally substituted alkyl, alkoxy or aryl,
$R_5$ denotes hydrogen or optionally substituted alkyl,
$R_6$ denotes alkylene,
$R_7$ denotes optionally substituted alkyl, aryl or aralkyl,
$R_8$ and $R_9$ denote hydrogen, optionally substituted alkyl, cycloalkyl, aryl or aralkyl or the radical of a heterocyclic compound or, together with the N-atom, denote a heterocyclic structure,
$R_{10}$ denotes hydrogen or optionally substituted alkyl, aryl or aralkyl,
$R_{11}$ denotes optionally substituted alkyl or aryl or dialkylamino and
$n$ denotes 1 or 2 and
the radical O—$R_6$—$OSO_3H$ is in the ortho-position or para-position relative to the azo group, are suitable for the dyeing and printing of the natural and synthetic amide group containing fiber materials.

3 Claims, No Drawings

WATER-SOLUBLE DIPHENYLAMINE-AZO-SULFATOALKOXYPHENYL DYESTUFFS

This invention relates to azo dyestuffs which, in the form of the free acid, correspond to the formula

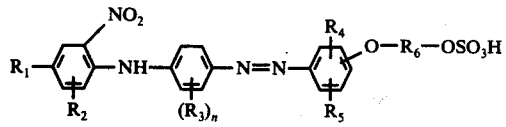 (I)

wherein
- $R_1$ denotes hydrogen, nitro, cyano, $SO_2$—$R_7$, $CONR_8R_9$, $SO_2NR_8R_9$, $SO_2OR_{10}$, $COOR_{10}$, $SO_2$—$NHSO_2$—$R_{11}$, sulpho or alkyl,
- $R_2$ denotes hydrogen, nitro, halogen or optionally substituted alkyl, alkoxy or aryl,
- $R_3$ denotes hydrogen, halogen, $SO_2$—$R_7$, $SO_2$—$NR_8R_9$ or optionally substituted alkyl, alkoxy or aryl,
- $R_4$ denotes hydrogen, halogen or optionally substituted alkyl, alkoxy or aryl,
- $R_5$ denotes hydrogen or optionally substituted alkyl,
- $R_6$ denotes alkylene,
- $R_7$ denotes optionally substituted alkyl, aryl or aralkyl,
- $R_8$ and $R_9$ denote hydrogen, optionally substituted alkyl, cycloalkyl, aryl or aralkyl or the radical of a heterocyclic compound or, together with the N-atom, denote a heterocyclic structure,
- $R_{10}$ denotes hydrogen or optionally substituted alkyl, aryl or aralkyl,
- $R_{11}$ denotes optionally substituted alkyl or aryl or dialkylamino and
- $n$ denotes 1 or 2 and
- the radical O—$R_6$—$OSO_3H$ is in the ortho-position or para-position relative to the azo group.

Suitable alkyl $R_1$-$R_5$ and $R_7$-$R_{10}$ is, in particular, alkyl with 1-4 C atoms which optionally can be further substituted by cyano, halogen, such as chlorine, bromine or fluorine, or $C_1$-$C_4$-alkoxy, for example methyl, ethyl, n-propyl, iso-propyl, n-butyl, tert.-butyl, cyanoethyl or 2-chloroethyl.

Suitable alkylene $R_6$ is, in particular, $C_1$-$C_6$-alkylene, for example $$-CH_2-\underset{\underset{OSO_3H}{|}}{CH}-CH_3, \quad -CH_2-CH_2-OSO_3H \text{ or}$$

$$-CH_2-\underset{\underset{OSO_3H}{|}}{CH}-C_3H_7, \text{ or } -CH_2-\underset{\underset{OSO_3H}{|}}{CH}-C_2H_5$$

Suitable alkyl $R_{11}$ is, in particular, unsubstituted $C_1$-$C_4$-alkyl, such as methyl, ethyl, ethyl, propyl or butyl.

Suitable aryl $R_2$-$R_4$ and $R_7$-$R_{10}$ is, in particular, phenyl which is optionally substituted by halogen, such as chlorine, bromine and fluorine, $C_1$-$C_4$-alkyl and $C_1$-$C_4$-alkoxy.

Suitable aryl $R_{11}$ is, for example, phenyl and naphthyl, which can optionally be substituted by $C_1$-$C_4$-alkyl, $C_1$-$C_4$-alkoxy, halogen, such as chlorine, bromine or fluorine, cyano or nitro, especially phenyl, o-, m- or p-tolyl, 1-naphthyl and 2-naphthyl.

Suitable alkoxy $R_2$ to $R_4$ is, in particular, $C_1$-$C_4$-alkoxy, such as methoxy, ethoxy or butoxy.

Suitable halogen $R_2$ to $R_4$ is chlorine, bromine or fluorine, but preferably chlorine.

Suitable aralkyl $R_7$ to $R_{10}$ is, for example, benzyl or phenethyl.

Suitable cycloalkyl $R_8$ and $R_9$ is, for example, cyclopentyl, cyclohexyl and cycloheptyl.

A suitable heterocyclic radical $R_8$ is, for example, the 3-sulpholanyl radical.

Suitable heterocyclic structures formed by $R_8$ plus $R_9$ with the inclusion of the N-atom of the amide group are piperidinyl, pyrrolidinyl and morpholinyl.

Suitable dialkylamino $R_{11}$ is, for example, di-$C_1$-$C_4$-alkylamino, such as dimethylamino or dibutylamino.

Preferred dyestuffs are those which, in the form of the free acid, correspond to the formula

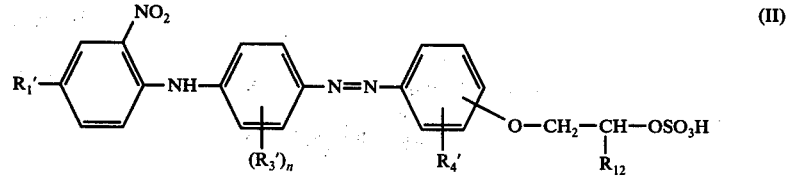 (II)

wherein
- $R_1'$ represents H, $SO_2$—$R_7'$, nitro, $SO_2NR_8'R_9'$ or $SO_2OR_{10}'$,
- $R_3'$ represents halogen, $C_1$-$C_4$-alkyl, $C_1$-$C_4$-alkoxy or $SO_2NR_8'R_9'$,
- $R_4'$ represents hydrogen, $C_1$-$C_4$-alkyl or phenyl,
- $R_7'$ and $R_{10}'$ represent $C_1$-$C_4$-alkyl, phenyl or benzyl,
- $R_8'$ and $R_9'$ represent $C_1$-$C_4$-alkyl, phenyl, benzyl or phenethyl or conjointly, with the N-atom, represent morpholinyl, piperidinyl or pyrrolidinyl and
- $R_{12}$ represents hydrogen, methyl or ethyl,
- $n$ has the abovementioned meaning and
- the

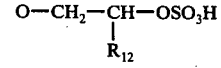

group is in the o-position or p-position relative to the azo bridge, and especially those of the formula

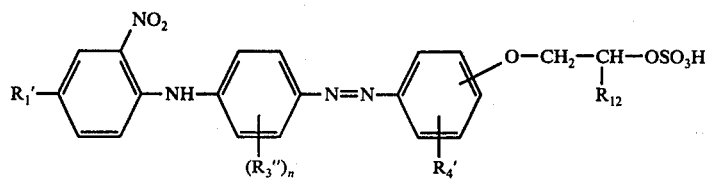

(III)

wherein
$R_3''$ represents H, methyl, ethyl, methoxy or ethoxy and
$R_1'$, $R_4'$, $R_{12}$ and $n$ have the abovementioned meaning and the radical

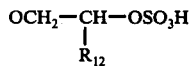

is in the o-position or p-position relative to the azo group.

Very particularly preferred dyestuffs are those which correspond to the formula

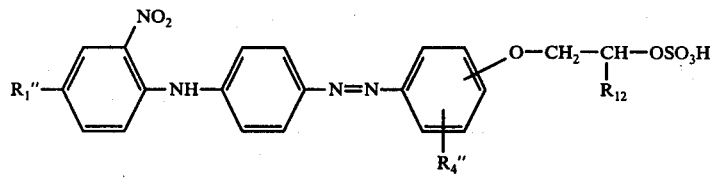

(IV)

wherein
$R_1''$ represents H, nitro, $SO_2NR_8''R_9''$ or $SO_2OR_{10}''$,
$R_4''$ represents H, methyl, ethyl, tert.-butyl or phenyl,
$R_8''$ and $R_9''$ represent $C_1$-$C_4$-alkyl, phenyl, benzyl or phenethyl and
$R_{10}''$ represents phenyl,
$R_{12}$ has the abovementioned meaning and the radical

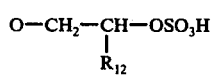

is in the o-position or p-position relative to the azo bridge.

The dyestuffs can be prepared in a manner which is in itself known according to various processes. One process is to diazotise an amine of the formula (V) and to couple the diazotised product with a phenolic component of the formula (VI) to give a dyestuff of the formula (VII):

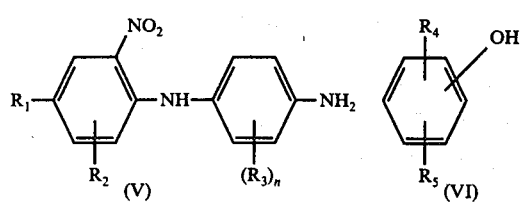

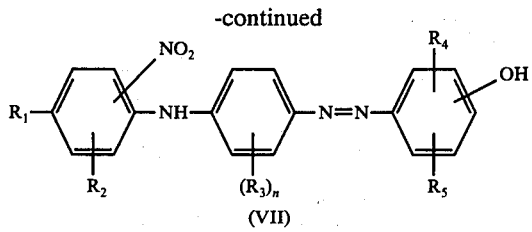

(VII)

In order to prepare the dyestuffs according to the invention the phenolic hydroxyl group in the compounds of the formula (VII) is, for example, alkylated with an alkylene oxide and the aliphatic hydroxyl group thus introduced is converted into the sulphuric acid half-ester (I) by means of sulphuric acid or oleum.

In the formula (V), (VI) and (VII), $R_1$ to $R_5$ and $n$ have the abovementioned meaning.

A further process for the preparation of the dyestuffs of the formula (VII) consists in condensing an aminoazo dyestuff of the formula (IX) with an o-nitro-halogeno-benzene of the formula (VIII)

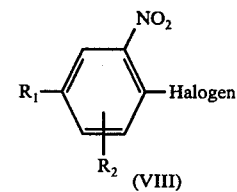

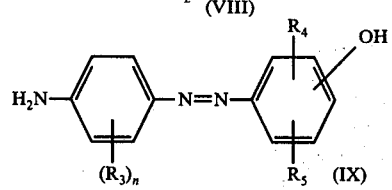

$R_1$ to $R_5$ and $n$ have the abovementioned meaning and halogen in particular representing chlorine or bromine.

Examples of suitable diazo components of the formula (V) are 2-nitro-4'-aminodiphenylamine, 2-nitro-3'-methoxy-4'-aminodiphenylamine, 2-nitro-2'-methyl-4'-aminodiphenylamine, 2,4-dinitro-2',5'-dimethoxy-4'-aminodiphenylamine, 2,4-dinitro-4'-aminodiphenylamine, 2-nitro-4-dimethylaminosulphonyl-4'-aminodiphenylamine, 2-nitro-4-dibutylaminosulphonyl-3'-methoxy-4'-aminodiphenylamine, 2-nitro-4-methylethylaminosulphonyl-4'-aminodiphenylamine, 2-nitro-4-diphenylaminosulphonyl-2'-ethyl-4'-aminodiphenylamine, 2-nitro-4-benzylmethylaminosulphonyl-4'-aminodiphenylamine, 2-nitro-4-(N-2-phenethyl-N-methyl)-sulphamoyl-3'-methyl-4'-aminodiphenylamine, 2-nitro-4-ethylsulphonyl-4'-aminodiphenylamine, 2,6-dinitro-4-benzylsulphonyl-2',5'-dichloro-4'-aminodiphenylamine, 2-nitro-4-cyano-3'-methylsulphonyl-4'-aminodiphenylamine, 2-nitro-4-diethylaminocarbonyl-2',5'-dichloro-4'-aminodiphenylamine, 2-nitro-4-diphenylaminocarbonyl-4'-aminodiphenylamine, 2-nitro-4-morpholin-1-yl-carbonyl-4'-aminodiphenylamine, 2-nitro-4-pyrrolidin-1-yl-carbonyl-3'-methoxy-4'-aminodiphenylamine, 2-nitro-4-methoxycarbonyl-3'-chloro-4'-aminodiphenylamine, 2-nitro-4-carboxy-3'-dimethylaminosulphonyl-4'-aminodiphenylamine, 2-nitro-4-sulpho-4'-aminodiphenylamine, 2-nitro-4-butoxycarbonyl-3'-ethyl-4'-aminodiphenylamine, 2-nitro-4-di-(2-cyanoethyl)-aminosulphonyl-4'-aminodiphenylamine, 2-nitro-4-morpholin-1-yl-sulphonyl-3'-methoxy-4'-aminodiphenylamine, 2-nitro-4-pyrrolidin-1-yl-sulphonyl-4'-aminodiphenylamine, 2,6-dinitro-3'N-benzyl-N-methylsulphamoyl-4'-aminodiphenylamine, 2-nitro-4-methyl-(4-chlorophenyl)-aminosulphonyl-3'-methyl-4'-aminodiphenylamine, 2-nitro-4-N-cyclohexyl-N-methylsulphamoyl-4'-aminodiphenylamine, 2-nitro-4-phenylsulphonylaminosulphonyl-2',5'-dichloro-4'-aminodiphenylamine, 2-nitro-4-(4-methylphenyl)-sulphonylaminosulphonyl-3'-methoxy-4'-aminodiphenylamine, 2-nitro-4-methylsulphonylaminosulphonyl-4'-aminodiphenylamine, 2-nitro-4-butylsulphonylaminosulphonyl-2'-methyl-4'-aminodiphenylamine, 2-nitro-4-dimethylaminosulphonylsulphamoyl-6-methyl-4'-aminodiphenylamine, 2,4-dinitro-2'-methoxy-4'-amino-5'-methyldiphenylamine, 2,4,6-trinitro-2'-chloro-4'-amino-5'-methoxy-diphenylamine, 2-nitro-4-phenoxysulphonyl-4'-aminodiphenylamine, 2-nitro-4-phenoxysulphonyl-2',5'-dichloro-4'-aminodiphenylamine, 2-nitro-4-butoxysulphonyl-4'-aminodiphenylamine and 2-nitro-4-benzyloxysulphonyl-4'-aminodiphenylamine.

Examples of suitable phenolic coupling components (VI) which may be mentioned are: phenol, o-cresol, m-cresol, p-cresol, 1-hydroxy-4-ethylbenzene, 1-hydroxy-4-tert.-butylbenzene, 1-hydroxy-2-ethylbenzene, 1-hydroxy-2-isopropylbenzene, 1-hydroxy-2-sec.-butyl-benzene, 3-hydroxy-1,2-dimethyl-benzene, p-chlorophenol, 2-hydroxy-1,4-dimethyl-benzene, 4-hydroxy-1,2-dimethyl-benzene, 2-hydroxy-1,3-diethyl-benzene, 1-hydroxy-2-methoxy-benzene, 1-hydroxy-3-methoxy-benzene, 1-hydroxy-3-ethoxy-benzene, 1-hydroxy-4-butoxy-benzene, 1-hydroxy-3-butoxy-benzene, 2-hydroxy-diphenyl, o-chlorophenol and 6-chloro-methylphenol.

Alkylene oxides which are suitable for the alkylation are, for example, ethylene oxide, propylene 1,2-oxide and butylene 1,2-oxide.

The condensation reaction of the o-nitro-halogenobenzenes (VIII) with the aminoazo dyestuffs (IX) to give the dyestuffs of the formula (VII), or, respectively, of o-nitrohalogenobenzenes with p-phenylenediamines or acyldiamines to give the diazo components (V) or, respectively, their acyl derivatives are carried out in a manner which is in itself known, for example in an aqueous medium, if necessary with the addition of organic solvents, such as alcohols or glycols, in the presence of acid-binding agents, such as magnesium oxide, calcium carbonate, alkali metal carbonates or alkali metal bicarbonates. The condensation reaction can also be carried out under anhydrous conditions, for example in glycol or glycol monomethyl ether, in the presence of sodium acetate. Temperatures between 50° and 200° C., preferably between 80° and 150° C., are used for the condensation reaction.

The diazotisation of the diazo components (V) is carried out in a manner which is in itself known, for example in acid aqueous solution or suspensions with sodium nitrite solution, it being possible for the diazotisation temperatures to be between 0° and 20°, but preferably between 10° and 15°.

The coupling of the diazotised amines (V) with the phenols of the formula (VI) to give the azo dyestuffs (VII) is also carried out in a customary manner, preferably in an aqueous-alkaline medium. The azo dyestuffs of the formula (VII) can be isolated by simply filtering off, if appropriate after the addition of sodium chloride. If the dyestuffs are obtained in an impure form, they can, in a known manner, be dissolved in hot water, if appropriate with the addition of alkali, and reprecipitated.

The reaction of the dyestuffs (VII) with alkylene oxides is carried out in a manner which is in itself known, for example in an aqueous alkaline medium or in an alkaline, aqueous-organic medium or in an organic medium with the addition of alkali or basic ion exchangers. The reaction is carried out at temperatures between 50° and 160° C. and, in the case of low-boiling alkylating agents, in an autoclave if necessary.

As well as it being possible to prepare the corresponding dyestuff intermediate products by alkylation of the phenolic hydroxyl group with alkylene oxides, this preparation can also be effected with the aid of other reactions, for example the reaction of phenols with α-halogenohydrins.

The esterification of the dyestuffs, thus obtained, with sulphuric acid is effected by introducing the dyestuffs into concentrated sulphuric acid, sulphuric acid monohydrate or oleum, preferably at temperatures between −5° and 20° C., and stirring the mixture for a further several hours. The sulphuric acid half-esters of the dyestuffs are precipitated by discharging the mixture onto ice water and are then neutralised with cooling and the dyestuff is isolated by filtration, if appropriate after salting out, for example with sodium chloride or potassium chloride.

The more sparingly soluble dyestuffs (I) can be rendered readily soluble in water by mixing them with salts of strong bases and weak acids, for example tri-sodium phosphate, di-sodium hydrogen phosphate, sodium tetraborate, sodium metaphosphate, sodium metasilicate or sodium carbonate.

The new dyestuffs of the formula (I) can be isolated, or can be present, or can be used further, in the form of the free acid or as alkali metal salts or ammonium salts. Suitable alkali metal salts are, for example, the sodium, potassium or lithium salts.

The new dyestuffs are particularly suitable for dyeing and printing natural and synthetic fibre materials containing amide groups, for example materials of wool, silk and polyamide, such as poly-ε-caprolactam or the reaction product of hexamethylenediamine with adipic acid. The resulting dyeings, especially those on polyamide materials, are distinguished by good fastness properties, especially by good fastness to wet processing and good fastness to light. The affinity for these materials in neutral media and the ability to be combined with other suitable dyestuffs for this material is also good. The levelling power is very good and the rates of uptake are rapid. The dyestuffs of the formula (I) are employed for dyeing either in the form of the free acid or as an alkali metal salt or as the ammonium salt.

EXAMPLE 1

293 g of 3-nitro-4-chloro-N,N-diethylbenzenesulphonamide, together with 150 g of 4-aminoacetanilide and 60 g of whiting are boiled under reflux in 3 l of water for 5 hours, whilst stirring. After cooling, the precipitate of the formula

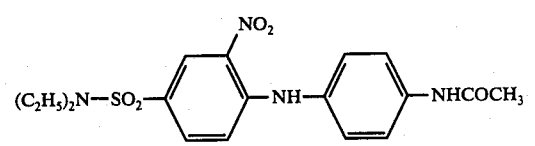

is filtered off, washed with water and dried at 60° C.

407 g of the compound (X) are suspended in 5.5 l of water at room temperature. 1.2 l of 45% strength aqueous sodium hydroxide solution are then added, whilst stirring. The solution thus obtained is stirred at 90° C. for 5 hours. After cooling, the amine of the formula

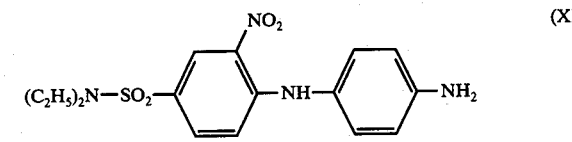

is filtered off, washed with water and dried at 60° C.

364 g of compound (XI) are suspended in 1.5 l of water and 600 ml of concentrated hydrochloric acid and, at 10°-15° C., 700 ml of a 10% strength sodium nitrite solution are added. The mixture is stirred for 1.5 hours at about 15° C. and the excess nitrite is then destroyed with amidosulphonic acid. This diazonium salt suspension is coupled with 94 g of phenol at 0°-5° C. and pH 9. The pH is kept at 9 by adding sodium hydroxide solution, until coupling has ended. 300 g of sodium chloride are then added to the solution in order to effect complete precipitation of the dyestuff. The dyestuff of the formula

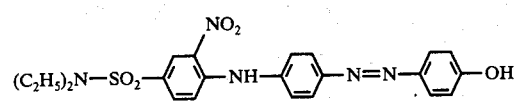

is filtered off, washed with a little water and dried at 50° C.

46 g of the dyestuff (XII) are dissolved in 400 ml of water, with the addition of concentrated sodium hydroxide solution, at pH 10.5. 18 g of 1,2-butylene oxide are added dropwise at 70° C. The mixture is stirred for 10 hours at 70° C. and allowed to cool and the dyestuff which has precipitated is filtered off, washed with sodium chloride solution and dried at 50° C. in vacuo. The dyestuff corresponds to the formula

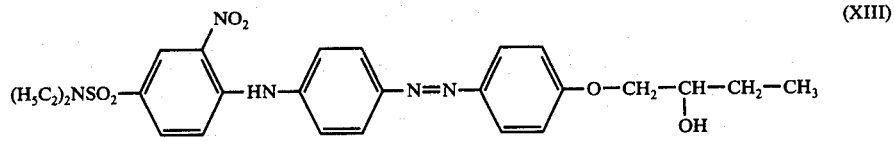

53 g of the dried and ground dyestuff of the formula (XIII) are introduced in the course of 1 hour into 140 g of sulphuric acid monhydrate, at 5° C., whilst stirring, and the mixture is stirred for 10-15 hours at 10°-15° C. The reaction mixture is then poured onto 300 g of ice and 100 ml of water and the mixture is neutralised with concentrated sodium hydroxide solution, whilst cooling well. The dyestuff, which in the form of the free acid corresponds to the formula

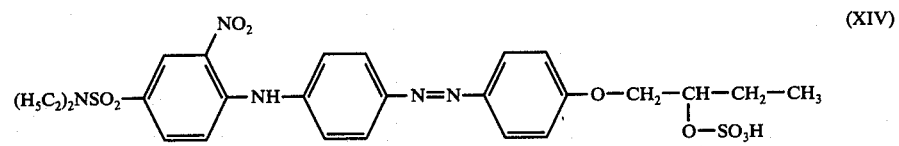

is then filtered off, washed with sodium chloride solution and dried in vacuo at 40° C.

DYEING EXAMPLE 5 ml of 10% strength ammonium acetate solution are added to 0.1 g of the dyestuff of Example 1, dissolved in 100 ml of hot water. The solution is then diluted to 500 ml with water. 10 g of polyamide fibre are introduced into the dyebath, the dyebath is brought to the boil in the course of 20 minutes, 4 ml of 10% strength acetic acid are added and the bath is kept at the boiling point for 1 hour. Thereafter, the dyeing is rinsed and dried at 70°-80° C. A Yellow dyeing with good fastness properties, in particular good fastness to light and wet processing, is obtained.

Similar dyestuffs, which have properties similar to those of the dyestuff obtained according to Example 1, are obtained when the diphenylamine diazo components which follow are diazotised and coupled with the phenols which follow, the phenolic hydroxyl group is alkylated with the indicated alkylene oxides and subsequently the aliphatic hydroxyl groups are converted into the sulphuric acid half-esters by means of sulphuric acid. The dyestuffs dye synthetic polyamides in yellow to orange-red shades with good fastness properties, for example good fastness to light and wet processing.

| Example | Diazo component from the 2-nitro-4'-aminodiphenylamine series | Coupling component | Alkylene oxide |
| --- | --- | --- | --- |
| 2 | | Phenol | Ethylene oxide |

-continued

| Example | Diazo component from the 2-nitro-4'-aminodiphenylamine series | Coupling component | Alkylene oxide |
|---|---|---|---|
| 3 | 3'-Methoxy | m-Cresol | Propylene oxide |
| 4 | 2'-Methyl | p-Cresol | Butylene 1,2-oxide |
| 5 | 4-Nitro-2',5'-dimethoxy | 2,6-Diethylphenol | Ethylene oxide |
| 6 | 4-Nitro | o-Cresol | Propylene oxide |
| 7 | 4-Dimethylaminosulphonyl | p-tert.-Butylphenol | Ethylene oxide |
| 8 | 4-Dibutylaminosulphonyl-3'-ethoxy | Phenol | Ethylene oxide |
| 9 | 4-Methylethylaminosulphonyl | p-Chlorophenol | Popylene oxide |
| 10 | 4-Diphenylaminosulphonyl-2'-ethyl | o-sec.-Butylphenol | Ethylene oxide |
| 11 | 4-Benzylmethylaminosulphonyl | o-Cresol | 1,2-Epoxyhexane |
| 12 | 4-(N-2-Phenethyl-N-methyl)-aminosulphonyl-3'-methyl | m-Ethoxyphenol | Ethylene oxide |
| 13 | 4-Ethylsulphonyl | p-Cresol | Propylene oxide |
| 14 | 4-Benzylsulphonyl | m-Cresol | Butylene 1,2-oxide |
| 15 | 4-Cyano-2'-methylsulphonyl | Phenol | Ethylene oxide |
| 16 | 4-Diphenylaminocarbonyl | Phenol | Propylene oxide |
| 17 | 4-Diethylaminocarbonyl-2'-5'-dichloro | p-Ethylphenol | Ethylene oxide |
| 18 | 4-N-Morpholin-1-yl-carbonyl | o-Chlorophenol | 1,2-Epoxypentane |
| 19 | 4-N-Pyrrolidin-1-yl-carbonyl-3'-methoxy | o-Phenylphenol | Propylene oxide |
| 20 | 4-Methoxycarbonyl-3'-chloro | Phenol | Propylene oxide |
| 21 | 4-Carboxy-3'-dimethylaminosulphonyl | m-Cresol | Butylene 1,2-oxide |
| 22 | 4-Butoxycarbonyl-3'-ethyl | o-Isopropylphenol | Ethylene oxide |
| 23 | 4-Di-(2-cyanoethyl)-aminosulphonyl | Phenol | Proylene oxide |
| 24 | 4-N-Morpholin-1-yl-sulphonyl-3'-methoxy | m-Cresol | Propylene oxide |
| 25 | 6-Nitro-3'-benzylmethylamino-sulphonyl | Phenol | Butylene 1,2-oxide |
| 26 | 4-p-Chlorophenylmethylaminosulphonyl-3'-methyl | o-Ethylphenol | Ethylene oxide |
| 27 | 4-N-Cyclohexyl-N-methylaminosulphonyl | o-Cresol | Propylene oxide |
| 28 | 4-Phenylsulphonylaminosulphonyl-2',5'-dichloro | m-Cresol | Propylene oxide |
| 29 | 4-p-Tolylsulphonylaminosulphonyl-3'-methoxy | p-Cresol | Ethylene oxide |
| 30 | 4-Methylsulphonylaminosulphonyl | o-Cresol | Propylene oxide |
| 31 | 4-Butylsulphonylaminosulphonyl | 3,4-Dimethylphenol | Butylene 1,2-oxide |
| 32 | 4-Dimethylaminosulphonyl-sulphamoyl-6-methyl | m-Cresol | Propylene oxide |
| 33 | 4-Nitro-2'-methoxy-5'-methyl | m-Cresol | Propylene oxide |
| 34 | 4,6-Dinitro-2'-chloro-6'-methoxy | p-Cresol | Ethylene oxide |
| 35 | 4-Dimethylaminosulphonyl | o-Phenylphenol | Ethylene oxide |
| 36 | 4-Benzylmethylaminosulphonyl | Phenol | Propylene oxide |
| 37 | 4-Diphenylaminosulphonyl | p-tert.-Butylphenol | Propylene oxide |
| 38 | 4-N-Butyl-N-ethylaminosulphonyl | m-Ethylenephenol | Ethylene oxide |
| 39 | 4-Nitro | p-Phenylphenol | Propylene oxide |
| 40 | 4-(N-2-Phenethyl-N-ethyl)-aminosulphonyl | Phenol | Ethylene oxide |
| 41 | 4-(N-3'-Sulpholanyl)-sulphamoyl | p-Cresol | Propylene oxide |
| 42 | 4-Phenoxysulphonyl | Phenol | Ethylene oxide |
| 43 | 4-Ethoxysulphonyl | m-Cresol | Propylene oxide |
| 44 | 4-Phenoxysulphonyl | m-Cresol | 1,2-Epoxyhexane |
| 45 | 4-Benzyloxysulphonyl | Phenol | Propylene oxide |
| 46 | 4-Phenoxycarbonyl | Phenol | Ethylene oxide |

We claim:
1. Azo dyestuff which, in the form of the free acid, corresponds to the formula

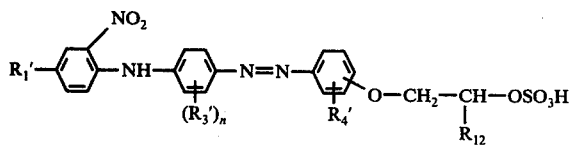

wherein $R_1'$ represents H, $SO_2$—$R_7'$, nitro, $SO_2NR_8'R_9'$ or $SO_2OR_{10}'$, $R_3'$ represents halogen, $C_1$–$C_4$-alkyl, $C_1$–$C_4$-alkoxy or $SO_2NR_8'R_9'$, $R_4'$ represents hydrogen, $C_1$–$C_4$-alkyl or phenyl, $R_7'$ and $R_{10}'$ represent $C_1$–$C_4$-alkyl, phenyl or benzyl, $R_8'$ and $R_9'$ represent $C_1$–$C_4$-alkyl, phenyl, benzyl or phenethyl and $R_{12}$ represents hydrogen, methyl or ethyl, $n$ denotes 1 or 2 and the

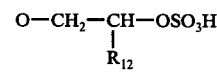

group is in the o-position or p-position relative to the azo bridge.

2. Azo dyestuff according to claim 1, which in the form of the free acid corresponds to the formula

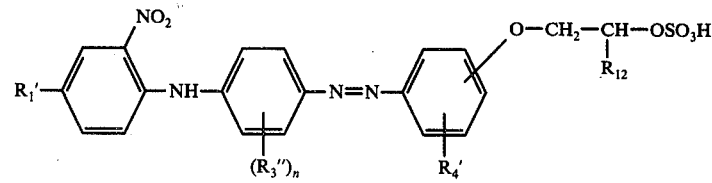

wherein $R_3''$ represents H, methyl, ethyl, methoxy or ethoxy and $R_1'$, $R_4'$, $R_{12}$ and $n$ have the abovementioned meaning and the radical

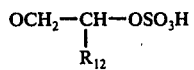

is in the o-position or p-position relative to the azo group.

3. Azo dyestuff according to claim 1, which in the form of the free acid corresponds to the formula

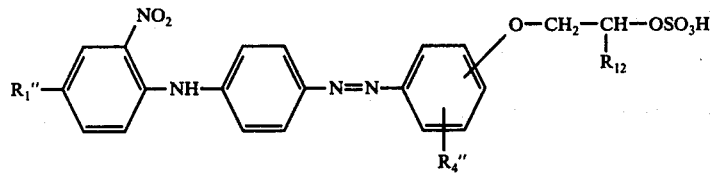

wherein
$R_1''$ represents H, nitro, $SO_2NR_8''R_9''$ or $SO_2OR_{10}''$,
$R_4''$ represents H, methyl, ethyl, tert.-butyl or phenyl,
$R_8''$ and $R_9''$ represent $C_1$–$C_4$-alkyl, phenyl, benzyl or phenethyl and
$R_{10}''$ for phenyl and
$R_{12}$ has the abovementioned meaning and the radical

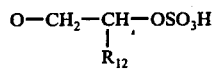

is in the o-position or p-position relative to the azo bridge.

* * * * *